United States Patent
Takamiya

(10) Patent No.: US 7,167,264 B2
(45) Date of Patent: Jan. 23, 2007

(54) E-MAIL RESPONSIVE PRINTING APPARATUS

(75) Inventor: Hiroyoshi Takamiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 840 days.

(21) Appl. No.: 10/202,912

(22) Filed: Jul. 26, 2002

(65) Prior Publication Data

US 2003/0025934 A1 Feb. 6, 2003

(30) Foreign Application Priority Data

Jul. 31, 2001 (JP) .............................. 2001/232766

(51) Int. Cl.
*G06F 3/12* (2006.01)
*G06K 1/00* (2006.01)

(52) U.S. Cl. ..................................... 358/1.15; 358/402
(58) Field of Classification Search .............. 358/1.15, 358/402; 715/517; 710/16, 9, 33
See application file for complete search history.

(56) References Cited

U.S. PATENT DOCUMENTS

| | | | |
|---|---|---|---|
| 5,903,716 A * | 5/1999 | Kimber et al. ............. 358/1.13 |
| 6,038,034 A | 3/2000 | Nishio et al. ............... 358/404 |
| 6,108,099 A * | 8/2000 | Ohtani ..................... 358/1.15 |
| 6,522,421 B1 * | 2/2003 | Chapman et al. .......... 358/1.15 |
| 6,932,523 B1 * | 8/2005 | Yamada et al. ............... 400/78 |
| 2001/0022662 A1 * | 9/2001 | Hosoda ...................... 358/1.9 |
| 2002/0030849 A1 | 3/2002 | Takamiya ................. 358/1.15 |
| 2002/0099782 A1 * | 7/2002 | Bando et al. ............... 709/206 |
| 2002/0143924 A1 * | 10/2002 | Iga ............................ 709/223 |
| 2002/0191210 A1 * | 12/2002 | Staas et al ................. 358/1.15 |
| 2003/0095281 A1 * | 5/2003 | Parry ........................ 358/1.15 |
| 2003/0233411 A1 * | 12/2003 | Parry et al. ................. 709/206 |

* cited by examiner

*Primary Examiner*—Kimberley Williams
*Assistant Examiner*—Dillon Murphy
(74) *Attorney, Agent, or Firm*—Fitzpatrick, Cella, Harper & Scinto

(57) ABSTRACT

A printing device has multiple finishing functions and multiple e-mail accounts on a mail server in a network. Correspondence between finishing functions set by a user and e-mail accounts are stored in a printing device. An e-mail sent to each e-mail account undergoes a finishing function based on the stored correspondence in order to be printed.

10 Claims, 12 Drawing Sheets

| ADDRESS | normal | booklet | 4 in 1s | ... |
|---|---|---|---|---|
| SORT | ON | — | ON | |
| ROTATIONAL SORT | OFF | — | OFF | |
| GROUP | OFF | — | OFF | |
| STAPLE | OFF | ON | OFF | |
| DUPLEXING | OFF | — | OFF | |
| LONG-SIDE BINDING | — | — | — | |
| SHORT-SIDE BINDING | — | — | — | |
| 2in1 | OFF | ON | OFF | |
| 4in1 | OFF | OFF | ON | |
| BOOKLET | OFF | ON | OFF | |
| RIGHT-HANDED / LEFT-HANDED OPENING | — | LEFT-HANDED OPENING | — | |
| ⋮ | ⋮ | ⋮ | — | |
| ⋮ | | | | |

E-MAIL RESPONSIVE PRINTING APPARATUS

BACKGROUND OF THE INVENTION

1. Field of the Invention

The present invention relates to a printing device having so-called finishing functions including edit functions such as a digital copier and an image processing system connected to a digital copier and a method of controlling the same.

2. Description of the Related Art

Hitherto, a copier is becoming widespread which includes finishing functions provided by a unit mainly called finisher, such as a sorter function for sorting multiple copies of output into a given number of units, a staple function for stapling each of sorted units, and an N in 1 function for gathering multiple pages into one piece of paper (where N is a number of pages gathered into one piece of paper). When such a digital copier is used as a single unit, the finishing function can be specified by an operation by, for example, an operator from an operation panel of the digital copier.

The digital copier is not only used as a single unit but also is connected to a host computer via a kind of interface device. Thus, a system has been developed which can output image data input by the host computer through the digital copier. When a driver program for controlling the digital copier is provided in the host computer connected to the digital copier, a finishing function to be performed in response to a print request can be specified for the system via a user interface provided by the driver program. In this case, the host computer writes the specification of the finishing function in, for example, the print job header in accordance with a data format determined between the host computer and the digital copier and sends print data as a print job body to the digital copier. The digital copier receives the job and analyzes the finishing specification written in the header. Then, the digital copier implements the printing as well as the specified function.

In the system connecting the digital copier and the host computer, when the driver program for the digital copier is provided to the host computer as described above, the finishing function can be used from the host computer. However, when the driver program is not compliant with functions of the used digital copier, that is, in the driver-less environment, the finishing function cannot be specified from the host computer.

In order to cause the digital copier to perform printing in the diver-less environment, it is necessary that the print data is edited in a form specified with respect to the digital copier and the print job is created and input to the digital copier. In general, a driver program for widely available peripherals is provided in the operating system. Therefore, by using a driver program compliant with the data format determined for the digital copier, simple printing functions can be used in the driver-less environment.

On the other hand, the driver is required for performing finishing processing specific to the digital copier for an input print job. Driver may not be necessary if the print data is processed in a desired format in the host computer for a part of finishing processing such as document layout. However, it can only implement a part of functions provided by the digital copier. For example, duplexing printing, booklet printing and the staple function can be performed only when the digital copier performs the functions it provides. In order to implement those functions without the driver compliant with the digital copier, the digital copier must realize the input print job and the finishing processing corresponding to the job. Therefore, an operator attempting printing must operate a panel of the digital copier to specify a finishing function or must specify the function from the other host computer having the driver.

As seen from the above, even if the digital copier has high level finishing functions, it is difficult for a device, which cannot specify a function compliant with the digital copier in the setting within the print job, such as a driver-less host computer, to use the finishing functions.

SUMMARY OF THE INVENTION

The present invention was made in view of the above related arts, and it is an object of the present invention to provide a printing device, which can use a non-standard functions such as a finishing function by using extremely easy steps, even when the function is not specified in a print job. It is another object of the present invention to provide a method of controlling the same.

In order to achieve the above object, the construction of the present invention is as follows:

According to one aspect of the present invention, there is provided a printing device for performing printing in accordance with a print job, which is input externally, including a setting unit for setting names of multiple input ports and functions corresponding to the multiple input ports, respectively, and a printing unit for performing print processing in accordance with a function corresponding to the input port to which the print job is input.

By using this construction, functions corresponding to input ports may be implemented.

Preferably, the setting unit can set multiple e-mail addresses registered for the printing device as the multiple input ports. When an e-mail is received in one of the e-mail address registered for the printing device, the printing unit may perform print processing in accordance with the function corresponding to the e-mail address.

Further objects, features and advantages of the present invention will become apparent from the following description of the preferred embodiments with reference to the attached drawings.

BRIEF DESCRIPTION OF THE DRAWINGS

FIG. 14 is a diagram showing an example of an address setting value correspondence table.

DESCRIPTION OF THE PREFERRED EMBODIMENTS

First Embodiment

Construction of Digital Copier

A digital copier, which is a first embodiment of the present invention, will be described below. The digital copier according to this embodiment includes an image processing device for performing edit functions and so on and an image forming device for forming an image on a printing medium under control of the image processing device. The term "edit function" may be used widely to refer to edit functions such as layout setting as well as to so-called finishing functions such as a sort function and a staple function.

Figure 1:
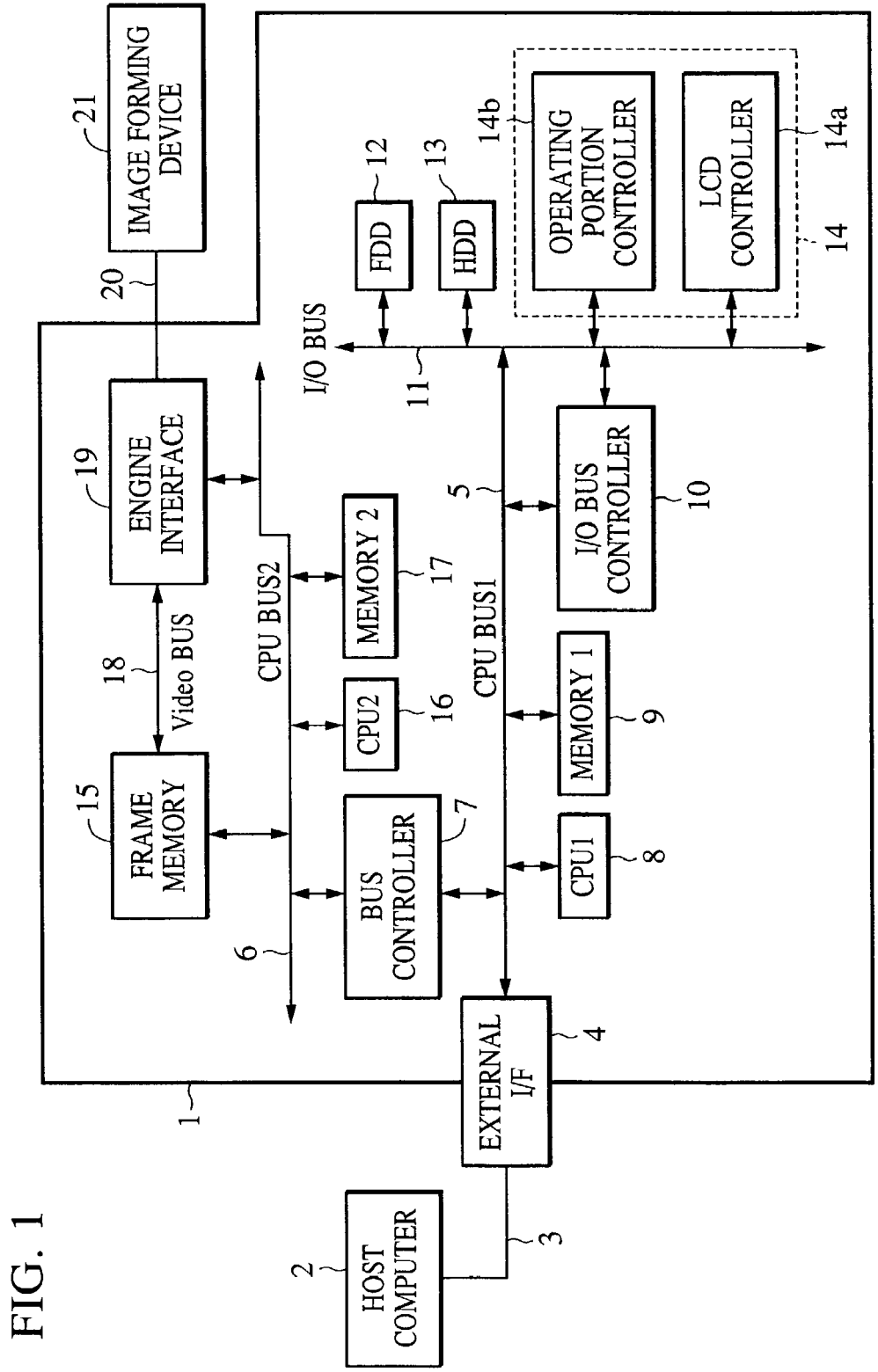
FIG. 1 is a block diagram of an image processing device.

First of all, the image processing device will be described with reference to FIG. 1. FIG. 1 shows a schematic diagram of the internal construction of an image processing device 1, which is a core of the present invention. A host computer 2 is connected to the image processing device 1 through an interface cable 3 via an external I/F 4. An image forming device 21 is connected to the image processing device 1 through an interface cable 20 via an engine interface 19. While the image forming device 21 is connected externally to the image processing device 1, here the same construction is possible even if they are provided within the same cabinet.

A first CPU 8 controls input/output not performed by the image forming device 21 connected externally. The external I/F 4 for interfacing with the host computer 2, a program memory 9, and an I/O bus controller 10 for controlling an I/O bus 11 are connected to a first CPU bus 5. A bus controller 7 is also connected to the first CPU bus 5 such that it can be coupled with a second CPU bus 6 of a second CPU 16. The second CPU 16 will be described later. The I/O bus controller 10 controls generic I/O including a floppy disk drive 12 connected to the I/O bus 11, a hard disk drive 13, an LCD controller 14a and a operating portion controller 14b. An operation panel 14 includes an LCD controlled by the LCD controller 14a and an operating portion controlled by the operating portion controller 14b.

The second CPU 16 controls the image forming device 21, which is connected to the second CPU 16, and expands image data stored in a frame memory 15. A second memory 17 is a program memory, and a control program is loaded from the hard disk drive 13 through the bus controller 7 when powered ON. The second memory 17 is also used for communication with the first CPU 8. An engine interface 19 is connected to the second CPU bus 6, and the image forming device 21 is controlled through different kinds of setting. A video bus 18 is an image-specific bus, and image data, which is expanded in the second CPU 16 and is stored in the frame memory 15, is sent to the engine interface 19 via the video bus 18 and then to the image forming device 21.

Figure 2:
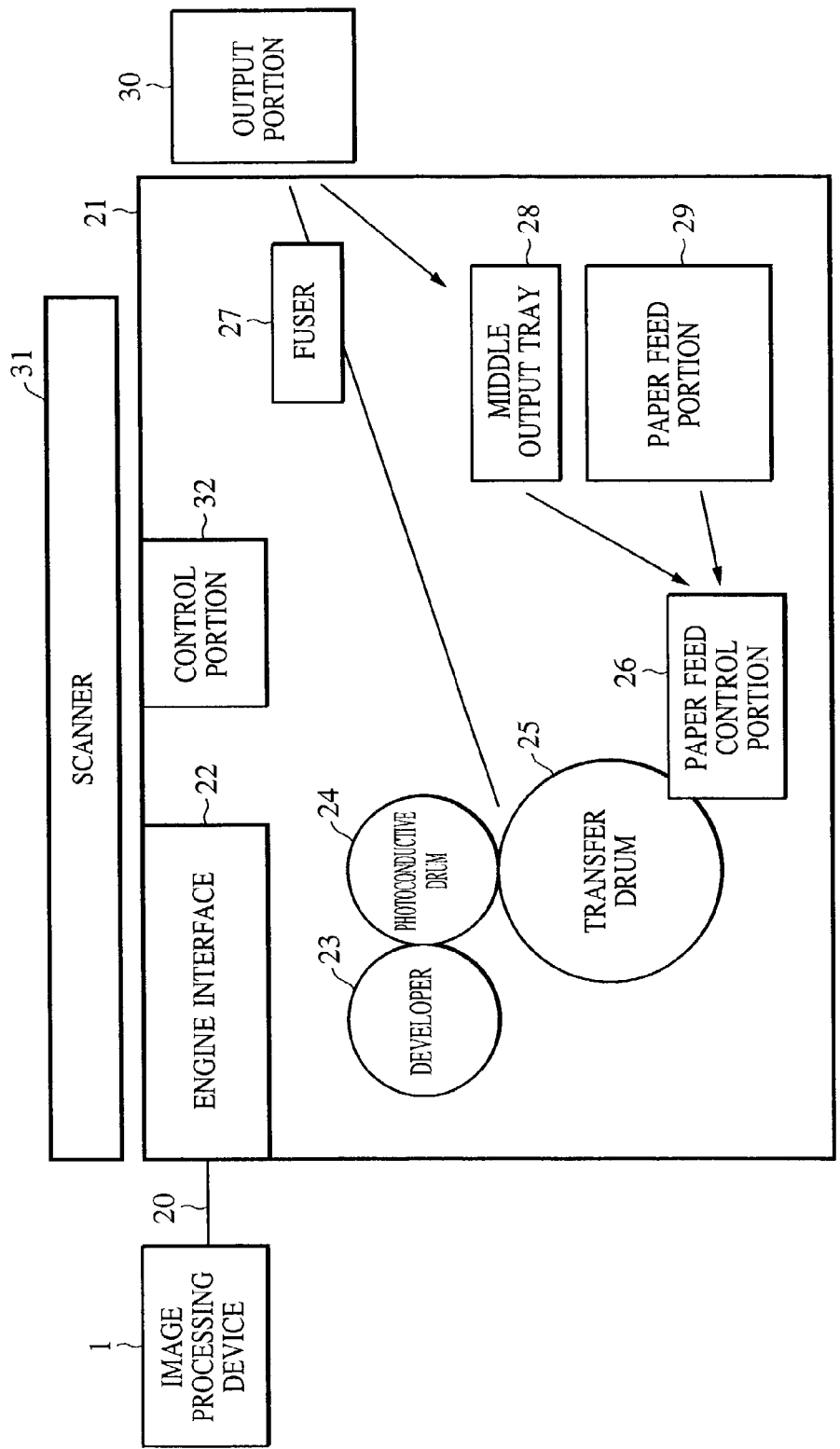
FIG. 2 is a block diagram of an image forming device.

Next, the image forming device 21 connected to the image processing device 1 will be described with reference to FIG. 2. An engine interface 22 is connected to the image processing device 1 through an interface cable 20. The image data, which is sent from the image processing device 1, becomes a latent image on a photoconductive drum 24, and an image is formed by a developer 23. A paper feed control portion 26 feeds paper from a paper feed portion 29 or a middle output tray 28 in accordance with an instruction from the image processing device 1. Then, the paper feed control portion 26 attaches paper on a transfer drum 25. After that, an image, which is formed on the photoconductive drum 24, is transferred on the paper attached to the transfer drum 25 and the image is fused by a fuser 27. After the image fusion, the paper is output to an output portion 30 or is stored in the middle output tray 28 in accordance with an instruction by the image processing device 1. Image data read by a scanner 31 is processed by a control portion 32 and is printed like the image data sent from the image forming device 21.

Next, processing for mapping edit functions to multiple virtual input ports for output, which is processing unique to the present invention, will be described with reference to FIGS. 3 and 12. E-mail addresses registered in an address setting value correspondence table 1401, which will be described later, function as input ports in effect for sources of print jobs in that functions corresponding to addresses are implemented by the digital copier. Accordingly, an e-mail address registered in the address setting value correspondence table 1401 is called "virtual input port" hereinafter.

Figure 3:
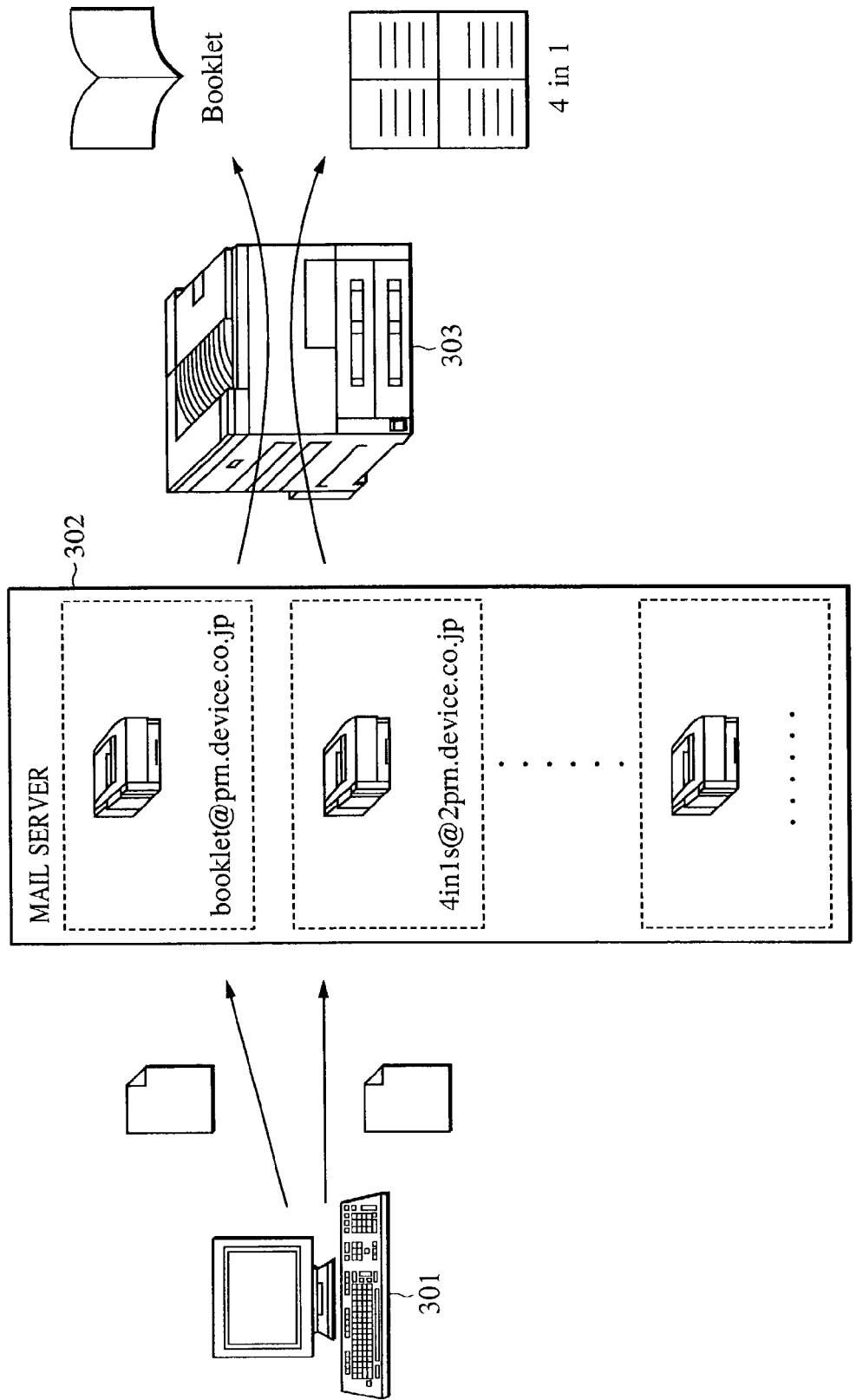
FIG. 3 is a schematic diagram for edit switching processing in accordance with multiple e-mail addresses.

FIG. 3 schematically shows how the processing is done. FIG. 3 illustrates a case where "booklet processing" and "4-in-1 processing" are performed as editing. Here, the "booklet processing" and the "4-in-1 processing" are separate names given to one print system, in this example, one digital copier. The "booklet processing" is mapped to an e-mail address, "booklet@prn.device.co.jp" and the "4-in-1processing" is mapped to an e-mail address "4inls@prn.device.co.jp". Both of the e-mail addresses "booklet@prn.device.co.jp" and "4inls@prn.device.co.jp" are addresses owned by the digital copier 303. A mail server 302 has accounts for addresses, respectively.

Notably, "booklet printing" refers to a print method whereby a whole output is saddle-stitched and is folded in two or is divided into units each having a predetermined number of pieces of paper, saddle-stitched, and folded in two and is stitched together in order to obtain a book form. The 4-in-1 processing refers to processing for gathering documents on four pages created by some application into one sheet. In general, the processing for gathering documents on N pages, which are created by some application, into one sheet is called "N-in-1 processing".

In FIG. 3, when the host computer 301 causes the digital copier 303 to process a print job involved in booklet processing for printing, the host computer 301 sends the corresponding job to "booklet@prn.device.co.jp", which is an e-mail address corresponding to the "booklet processing". The e-mail is received and is held and managed by the mail server 302, which manages the e-mail address. The mail server 302 temporally stores e-mail addressed to an e-mail address managed by the mail server 302. In addition, when the mail server 302 is set so as to notify the e-mail receipt, the mail server 302 notifies to the digital copier 303 that an e-mail is received.

When the digital copier 303 receives the notification of the e-mail receiving or realizes the e-mail receiving by polling the mail server 302, the digital copier 303 reads out the body of the e-mail, that is, the print job. Unread e-mails are read out for each account corresponding to the addresses of the received e-mails. At that time, when a password has been set, the set password is sent to the mail server 302, where the set password is authenticated. Once the message of the e-mail is read, processing corresponding to the address "booklet@prn.device.co.jp", that is, booklet processing is performed for the read print job, and the output is obtained.

Similarly, in order to process a print job involving the 4-in-1 processing by using the digital copier 303, the host computer 301 sends the job to the e-mail address, "4inls@prn.device.co.jp", which is mapped to the "4-in-1 processing". The e-mail is received by the mail server 302, which manages the e-mail address, and is held and managed. When the e-mail is received, the mail server 302 notifies the e-mail receiving to the digital copier 303 if the notification of e-mail receiving is set.

When the digital copier 303 receives the notification of the e-mail receipt or realizes the e-mail receipt by poling the mail server 302, the digital copier 303 reads out the body of the e-mail, that is, the print job. Unread e-mails are read out for each account corresponding to the addresses of the received e-mails. At that time, when a password has been set, the set password is sent to the mail server 302, where the set password is authenticated. Once the body of the e-mail is read, processing corresponding to the address "4inls@prn.device.co.jp", that is, 4-in-1 processing is performed for the read print job, and the output is obtained.

Figure 12:
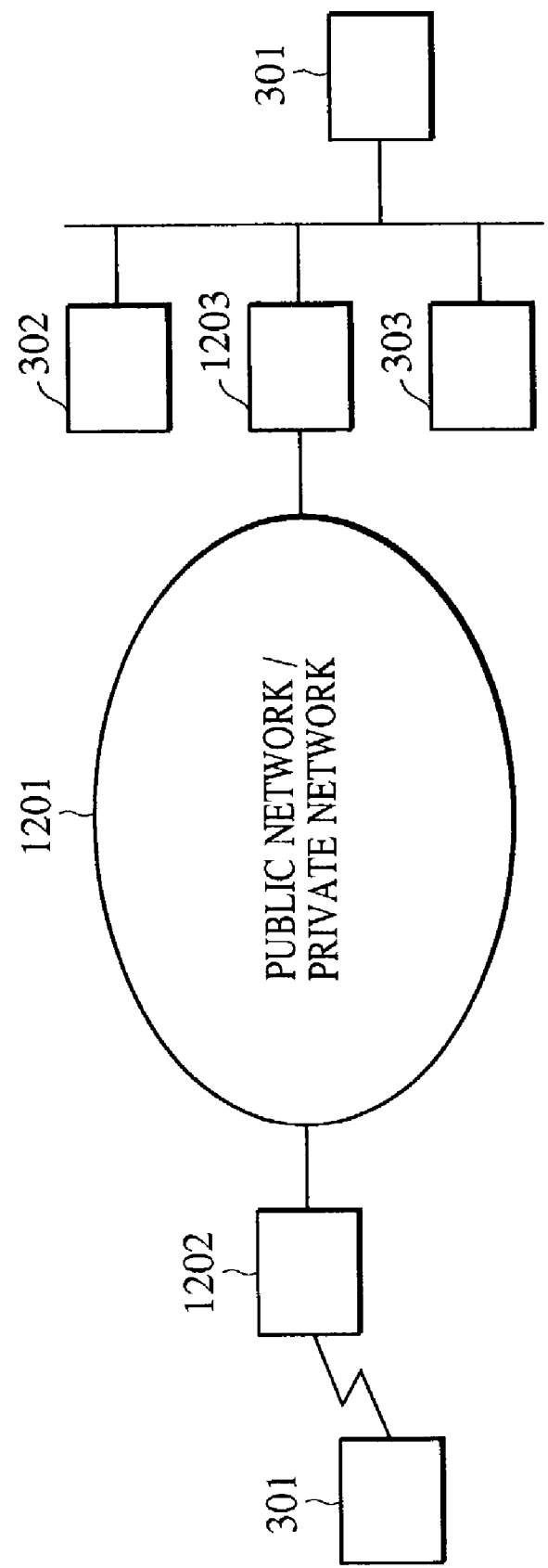
FIG. 12 is a diagram showing an example of a network including a digital copier and a host computer, which is a user of the digital copier.

FIG. 12 is a diagram showing an example of a network system including the digital copier 303, the host computer 301, which is the user of the digital copier 303, and the mail server 302, which has an account of the digital copier 303. FIG. 12 includes two constructions. In the first construction, the host computer 301 is connected to a local area network including the digital copier 303 through a mail server 1202 and a private/public network 1201. The local area network is connected to the private/public network 1201 through a router 1203 and has the mail server 302 and the digital copier 303 therein. In the second construction, the host computer 301 is connected within the local network in which the digital copier 303 is also connected. The mail server 302 must support a mail transfer protocol such as SMTP and POP so that the digital copier 301 can read out an e-mail from the mail server 302 as necessary. The SMTP and POP are extremely common as the mail transfer protocol over the network. Therefore, commercially available applications for e-mail exchanges are compliant with these protocols. Thus, the host computer 301 only requires to install one of the commercially available applications. The digital copier 303 also requires an e-mail exchange program compliant with these protocols. Except for that processing has to be performed without any user intervention, the program itself only needs the same function as that of the e-mail application for the host computer.

Mail Addresses and Setting

Figure 13:
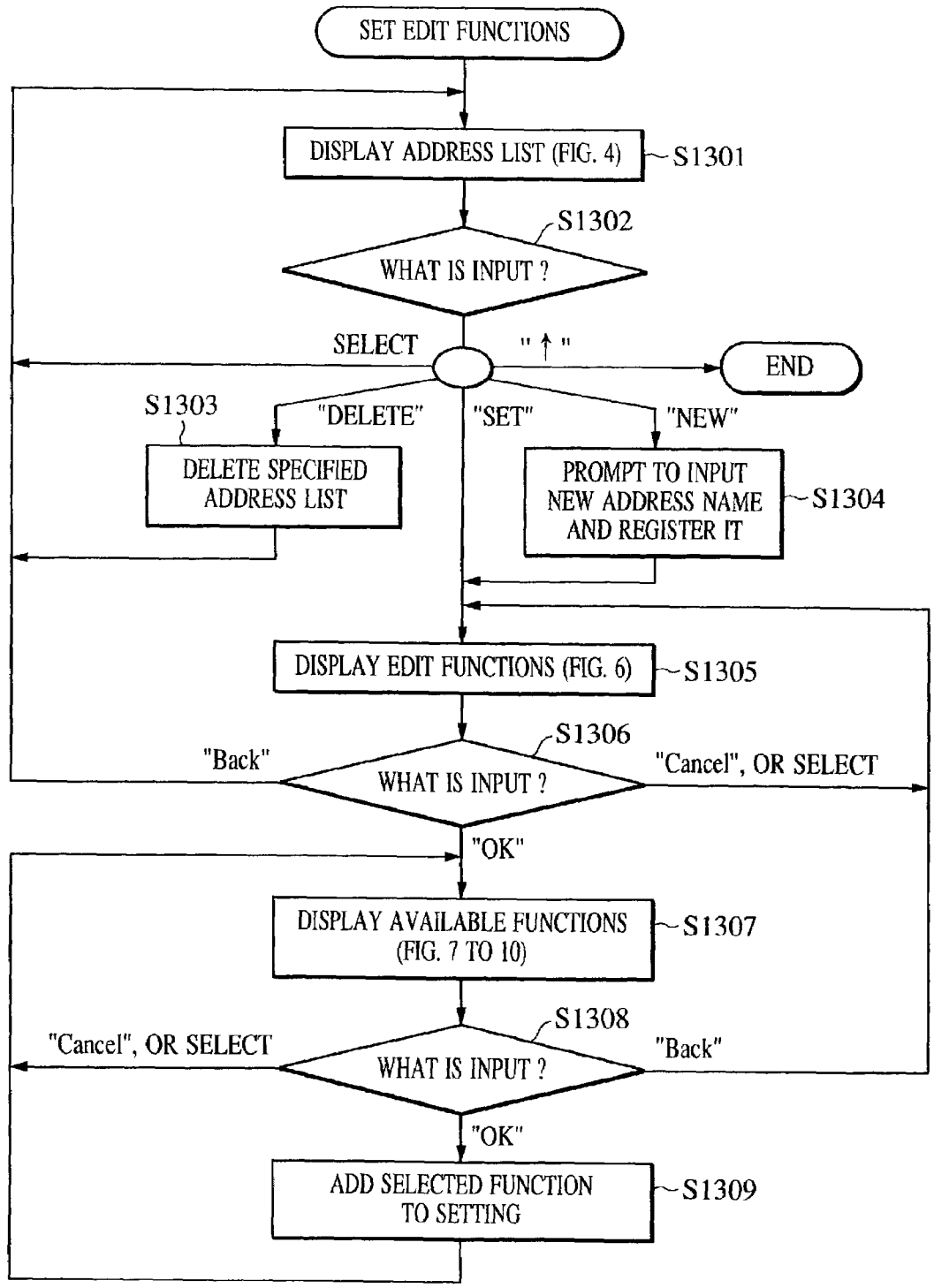
FIG. 13 is a flowchart showing steps for setting an edit function in the digital copier.

Next, operational steps for setting and managing e-mail addresses, which are virtual input ports, and edit functions corresponding to the e-mail addresses in a digital copier will be described with reference to FIGS. 4 to 10 and FIG. 13. The setting and management operations are performed from the operation panel 14. An operator manipulates a predetermined switch from the operation panel 14 so as to start processing in FIG. 13. The processing in FIG. 13 is for displaying and for maintaining the address setting value correspondence table 1401. The address setting value correspondence table 1401 is stored in a memory, which does not lose the content even after powered off, such as a nonvolatile memory, not shown, and the HDD 13. As shown in FIG. 14, e-mail addresses and values for edit settings, which are set to respective addresses are stored in the address setting value correspondence table 1401.

Figure 4:
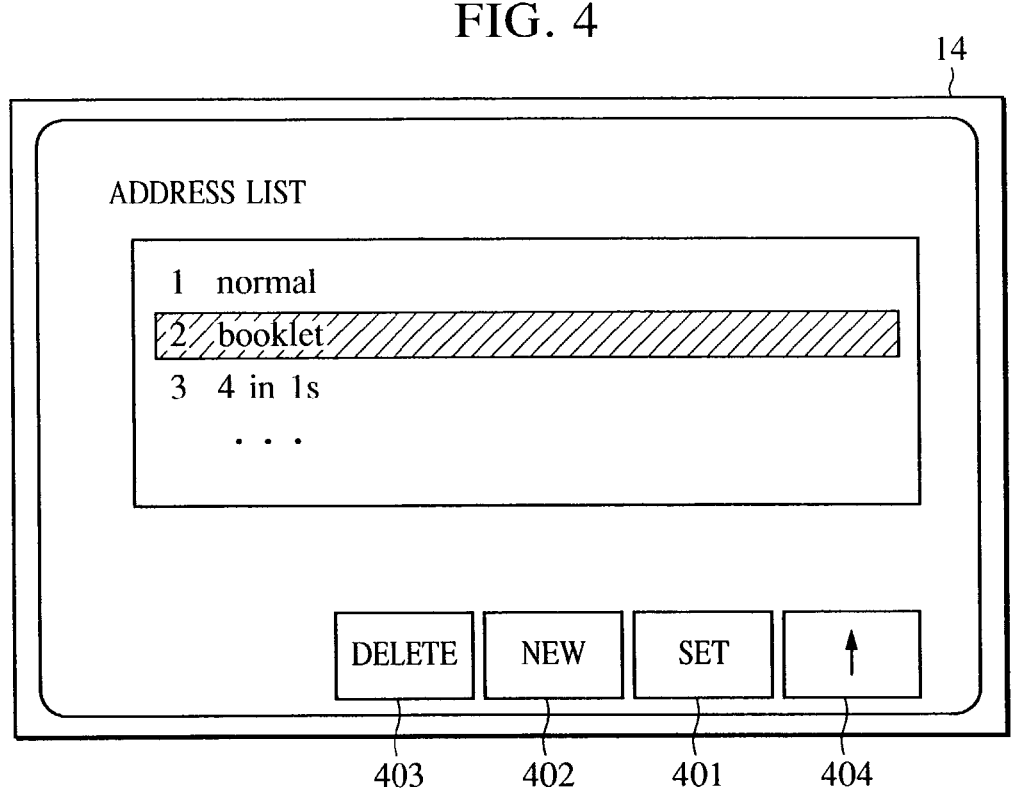
FIG. 4 is a schematic diagram of an operation panel for selecting another name in an address list.

In FIG. 13, first of all, an address list is displayed as shown in FIG. 4 in a step S1301. The address list lists all of e-mail addresses registered in the address setting value correspondence table 1401. FIG. 4 shows a list of e-mail addresses that the digital copier has in the mail server. In this example, while "username@domainname" is given as an e-mail address, the digital copier holds and displays only the username part. This is because the domain name depends on the network system that the digital copier belongs to, and therefore the user name in the e-mail address is mapped to a finishing function. Since the account authentication by the mail server is generally performed on the user name, only domain name is required to hold.

After the display, an input is tested in a step S1302. The input is one of a [↑] button 404, a [SET] button 401, a [NEW] button 402, a [DELETE] button 403 and one selection from the address list. The selection is performed by pressing one in the list itself. Based on the input, following processing is performed:

From the display shown in FIG. 4, which e-mail address is mapped to which edit function can be set. In order to map an edit function to an e-mail address, an e-mail address to be set is selected and the [SET] button 401 is pressed thereon. Thus, the edit function can be set on screens in FIG. 6 and below. In FIG. 4, an address "booklet" is selected. As shown, the selected e-mail address is highlighted, and the address list is displayed again.

By pressing the [↑] button 404, the processing in FIG. 13 ends. Then, the screen returns to an upper level menu, not shown here.

Further, e-mail addresses can be created and deleted on this screen. By pressing the [NEW] button 402, a new e-mail address, not shown here, can be input. Once the [NEW] button 402 is pressed, a new address name is prompted to input and then is registered in a step S1304. After the registration, the processing goes to a step S1305, where setting corresponding to the registered address can be performed on the screens shown in FIG. 6 and below. The input e-mail address may be registered in the mail server separately by the operator or may be registered in the mail server by issuing a request for getting an e-mail account immediately after the input of the new e-mail address. In the latter case, the mail server checks whether or not the same address exists therein. If the same address exists, the mail server notifies to the digital copier that the address cannot be registered. When the digital copier can successfully register the new mail account, the digital copier can send the new mail account as an e-mail to the user address, which has been registered in advance. In this case, after setting an edit function corresponding to the new address, the setting can be added thereto and can be sent.

Figure 5:
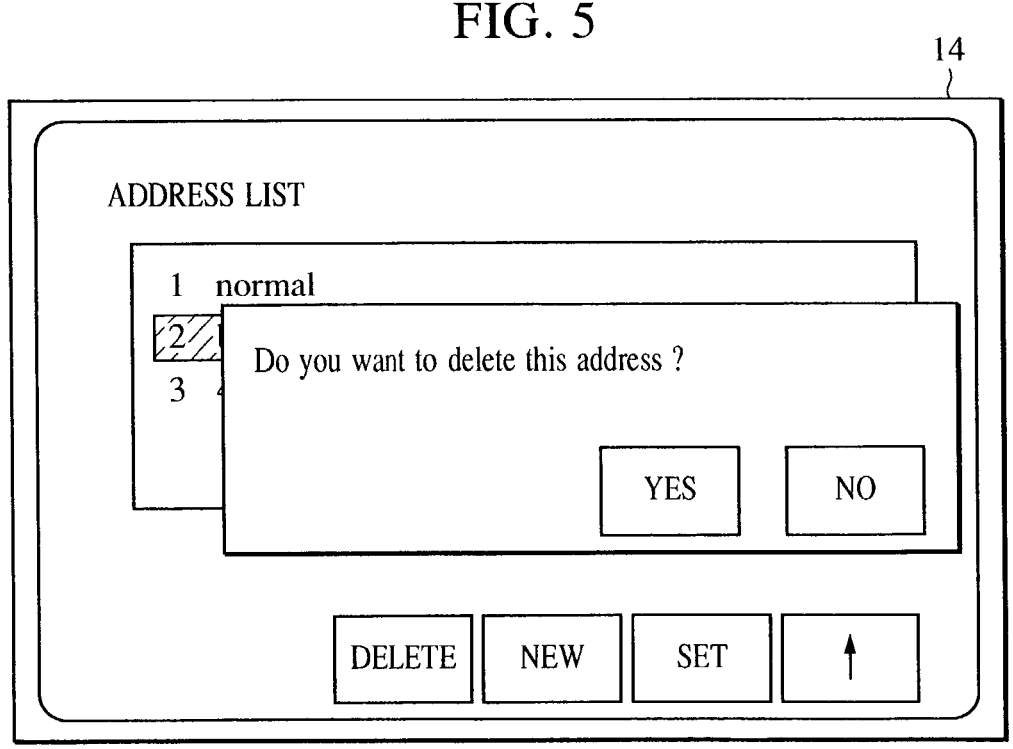
FIG. 5 is a diagram of a confirmation screen corresponding to the [Delete] button of FIG. 4.

Once the [DELETE] button 403 is pressed after the address selection on the screen in FIG. 4, the processing goes to a step S1303. There, a confirmation screen as shown in FIG. 5 is displayed in the pop-up manner. FIG. 5 shows the confirmation screen when the [DELETE] button 403 is pressed on the screen in FIG. 4. If [YES] is pressed here, the selected e-mail address and the corresponding setting value are deleted from the address setting value correspondence table 1401. If [YES] is pressed here, the delete function is canceled and the processing returns to the screen in FIG. 4, where an e-mail address can be selected. After the deletion, the address list is displayed again.

Figure 6:
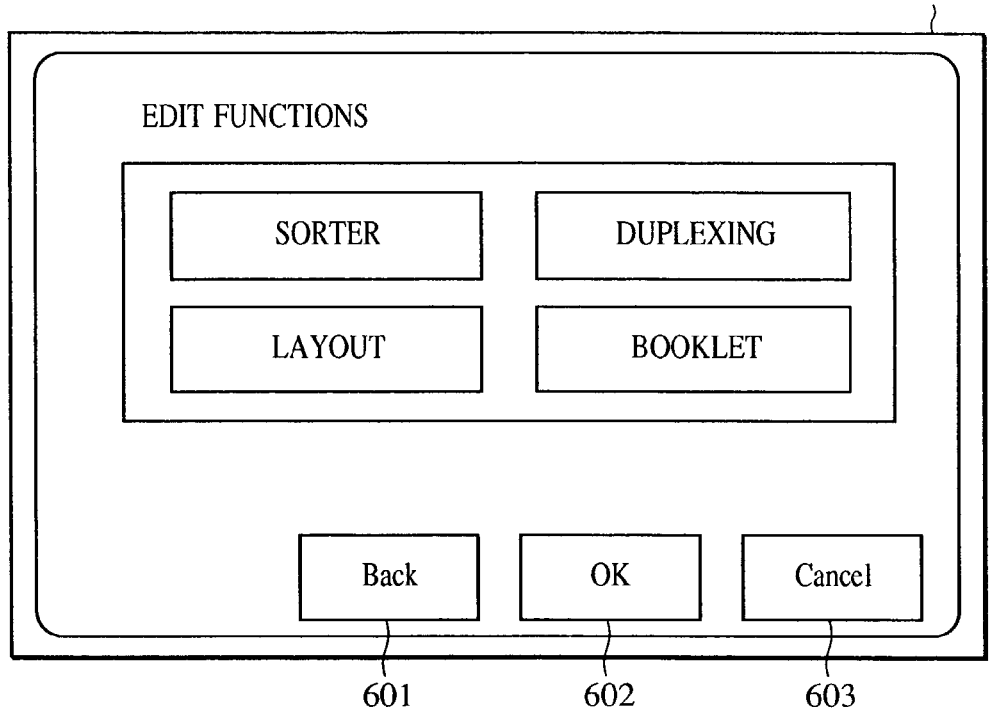
FIG. 6 is a schematic diagram (1) of a panel for specifying an edit function.

In the step S1302, if it is determined that the [SET] button 401 is pressed, a screen in FIG. 6 is displayed in a step S1305. FIG. 6 is a schematic diagram of the operating portion for setting edit functions. Though not shown, a selected item is highlighted in order to indicate that it is selected.

The input on the screen in FIG. 6 is tested in a step S1306. When an [OK] button 602 is pressed, the detail list of the currently selected item (the highlighted item), that is the function to be set, is displayed in a step S1307, as shown in FIGS. 7 to 10. When a [Back] button 601 is pressed, the address list on the previous screen in the step S1301 is displayed again. When a [Cancel] button 603 is pressed, all of settings are cancelled and initialized. Then, the screen in FIG. 6 is displayed again through the step S1305.

When the [OK] button 602 is pressed in the step S1306 and the processing goes to the step S1307, one of the screens in FIGS. 7 to 10 is displayed depending on the currently selected function. On the displayed operation screen, the details of the edit function specified on the screen in FIG. 6 can be set. The screens corresponding to the buttons [OK], [Back] and [Cancel] in FIGS. 7 to 10 are displayed in the same manner. In other words, when the [OK] button is pressed the processing goes to a step S1309. In the step S1309, the value set on the operation screen is registered in the address setting value correspondence table 1401 as a setting value for the item (function) selected in the step 1307. When the [Back ]0 button is pressed, the processing returns to the step S1305 where the previous screen, that is, the list of edit function details is displayed. When the [Cancel] button is pressed, all of settings are cancelled and are initialized. Then, screens in FIGS. 7 to 10 are displayed again in the step S1307. However, some set items may require more detail setting. For example, the staple setting in FIG. 7 requires a stapled position to be set. The setting is performed in the step S1309 in FIG. 13. The detail setting is performed by repeating the steps S1307 to S1309 where one of listed and displayed candidates for the stapled position is selected.

Figure 7:
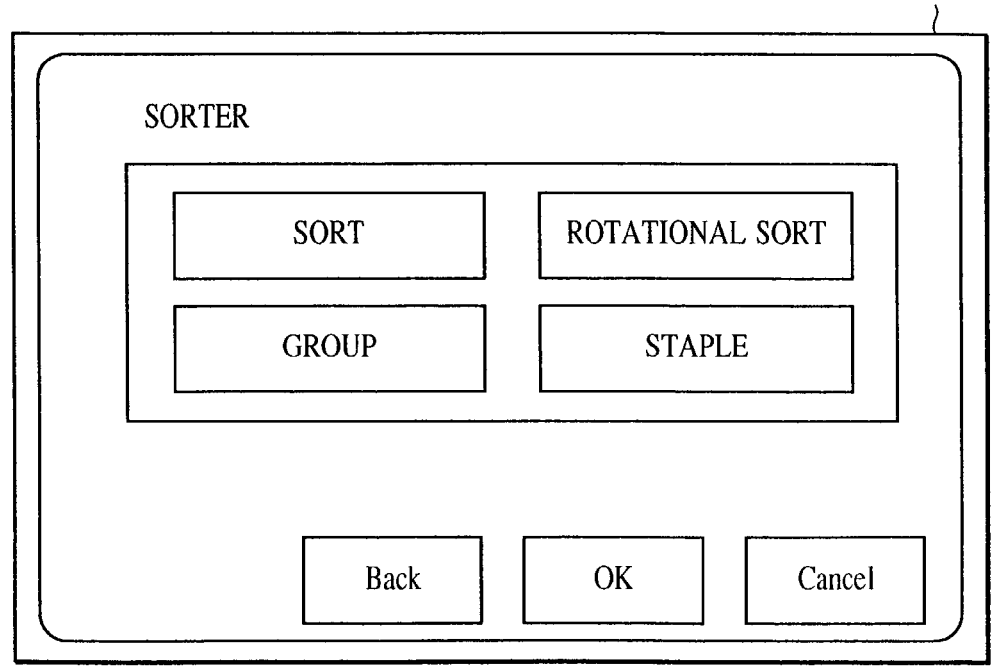
FIG. 7 is a schematic diagram (2) of a panel for specifying an edit function.

FIG. 7 is a schematic diagram of an operating portion for setting details of the function under [SORTER]. When multiple copies are printed, how each unit of pages and/or each page are printed is specified under the button [SORTER]. A button [SORT] is selected in order to obtain an output in units. A button [ROTATIONAL SORT] is selected in order to obtain an output in which the paper direction of each unit is rotated 90 degree. A button [GROUP] is selected in order to obtain an output in pages. A button [STAPLE] is selected in order to obtain a stapled output.

Figure 8:
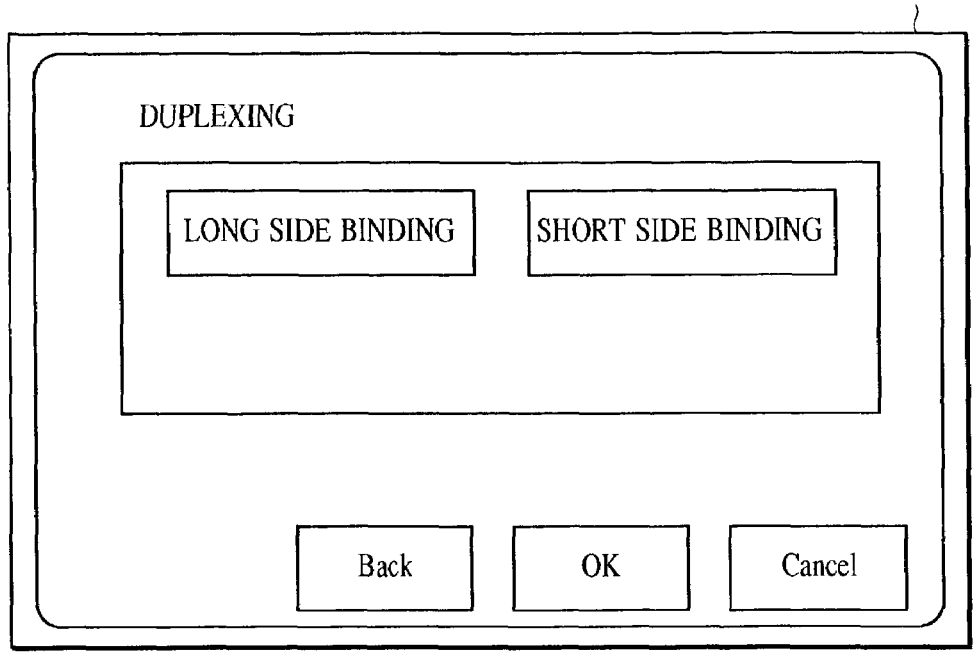
FIG. 8 is a schematic diagram (3) of a panel for specifying an edit function.

FIG. 8 shows a schematic diagram of an operating portion for setting details of the function under the button [DUPLEXING]. The Button [DUPLEXING] is selected in order to specify a binding direction for duplexing. A button [LONG SIDE BINDING] is selected in order to obtain an output in which the printed image thereon is in the right direction in long side binding. A button [SHORT SIDE BINDING] is selected in order to obtain an output in which the printed image thereon is in the right direction in short side binding.

Figure 9:
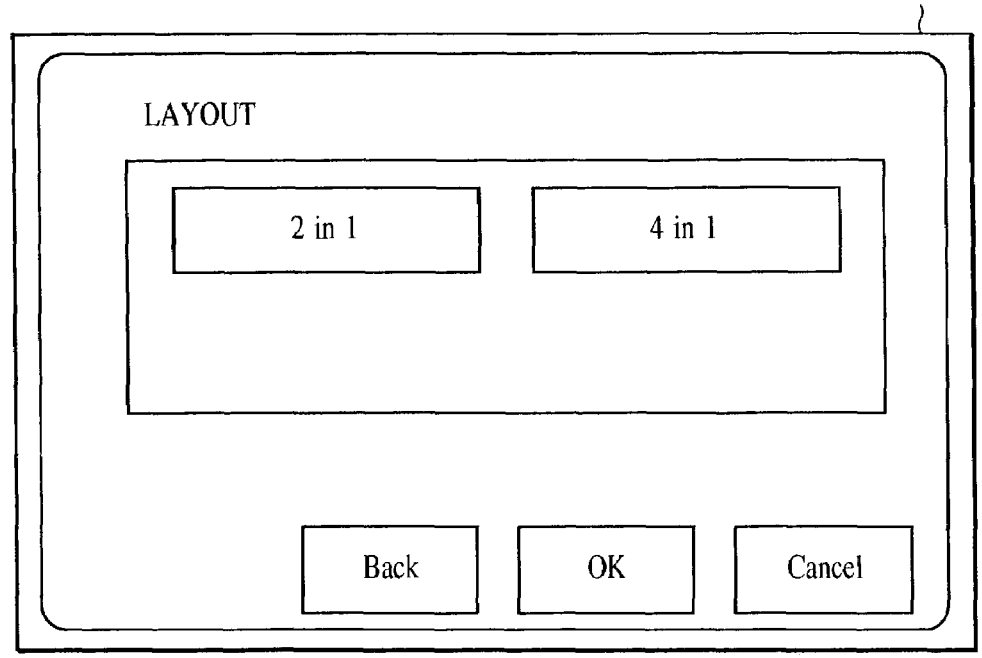
FIG. 9 is a schematic diagram (4) of a panel for specifying an edit function.

FIG. 9 is a schematic diagram of an operating portion for setting details of the function under a button [LAYOUT]. The button [LAYOUT] is selected in order to perform specification for printing multiple pages on one piece of paper. A button [2in 1] is selected in order to obtain an output in which the printed image thereon is formed by reducing the size of two pages so as to fit to one piece of paper. A button [4in 1] is selected in order to obtain an output in which the printed image thereon is formed by reducing the size of four pages so as to fit to one piece of paper.

Figure 10:
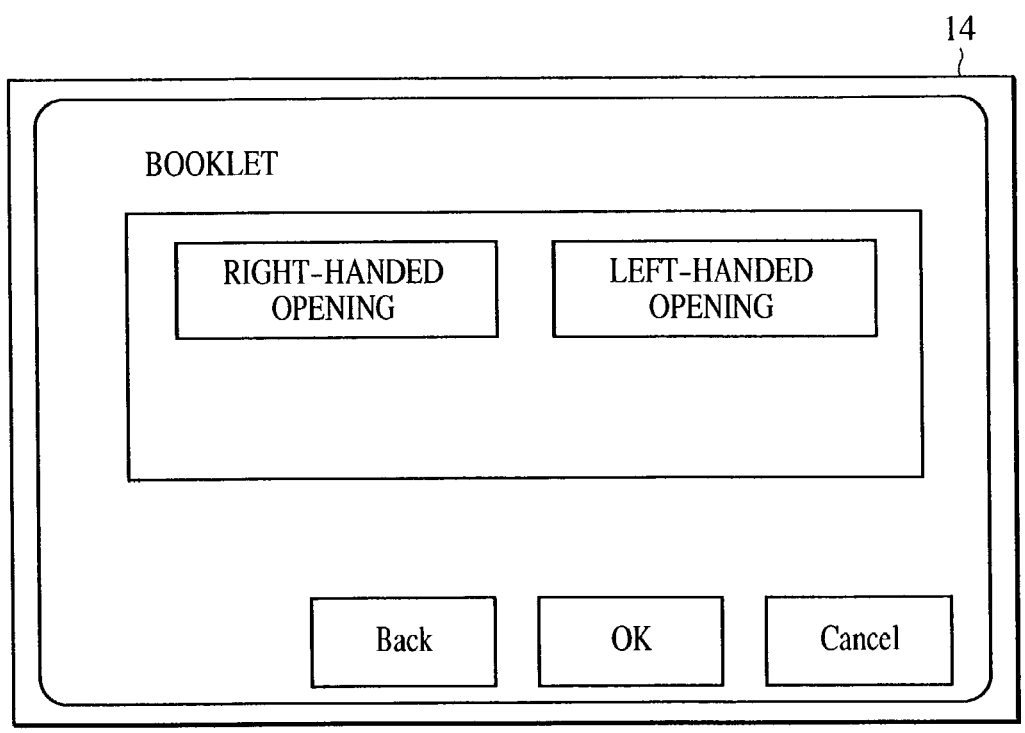
FIG. 10 is a schematic diagram (5) of a panel for specifying an edit function.

FIG. 10 is a schematic diagram of an operating portion for setting details of the function under a button [BOOKLET]. The button [BOOKLET] is selected in order to set such that the page order of the output folded in two is correct. A button [RIGHT-HANDED OPENING] is selected in order to obtain an output in which pages are printed so as to open toward the right hand direction as a result of booklet printing. A button [LEFT-HANDED OPENING] is selected in order to obtain an output in which pages are printed so as to open toward the left hand direction as a result of booklet printing.

The address setting value correspondence table 1401 in FIG. 14 shows an example of settings. For example, the [BOOKLET] is turned ON for an address, "booklet", and the [LEFT-HANDED OPENING] is set. The [STAPLE] is also turned ON. If the [BOOKLET] is turned ON, the stapled position is a center of paper. Furthermore, [2in 1] is turned ON. By turning the [BOOKLET] ON, the other settings are automatically determined. Thus, all of them are not set or the setting values are ignored in printing.

In this way, the settings for functions corresponding to e-mail addresses can be maintained or displayed.

Creation of Print Job

Next, steps for creating a print job in a host computer 301 by using the digital copier 303 will be described briefly. First of all, for printing, the host computer 301 converts print data created by some application to a form, which can be interpreted by the digital copier 303. This conversion processing may be performed by outputting one page of a document created by some application on one piece of paper as it is in accordance with a page description language supported by the digital copier 303. In other words, the print job may be created by a driver program for a printer having an extremely simple construction without finishing functions, for example, if the page description language to be converted is compatible with the printer. However, the print job is not sent to the digital copier 303 as it is, but is once stored in a hard disk of the host computer as a file.

After that, the created print job is sent to the e-mail address corresponding to a desired function as a message or as an attached document. For example, for the booklet printing, the address is "booklet@prn.device.co.jp". Notably, the mapping between the addresses and functions are notified to the user in advance. The e-mails can be sent by using a program for performing total processing including the print job creation, or by using commercially available e-mail software.

Steps For Performing Print Processing Through Address Specification

Figure 11:
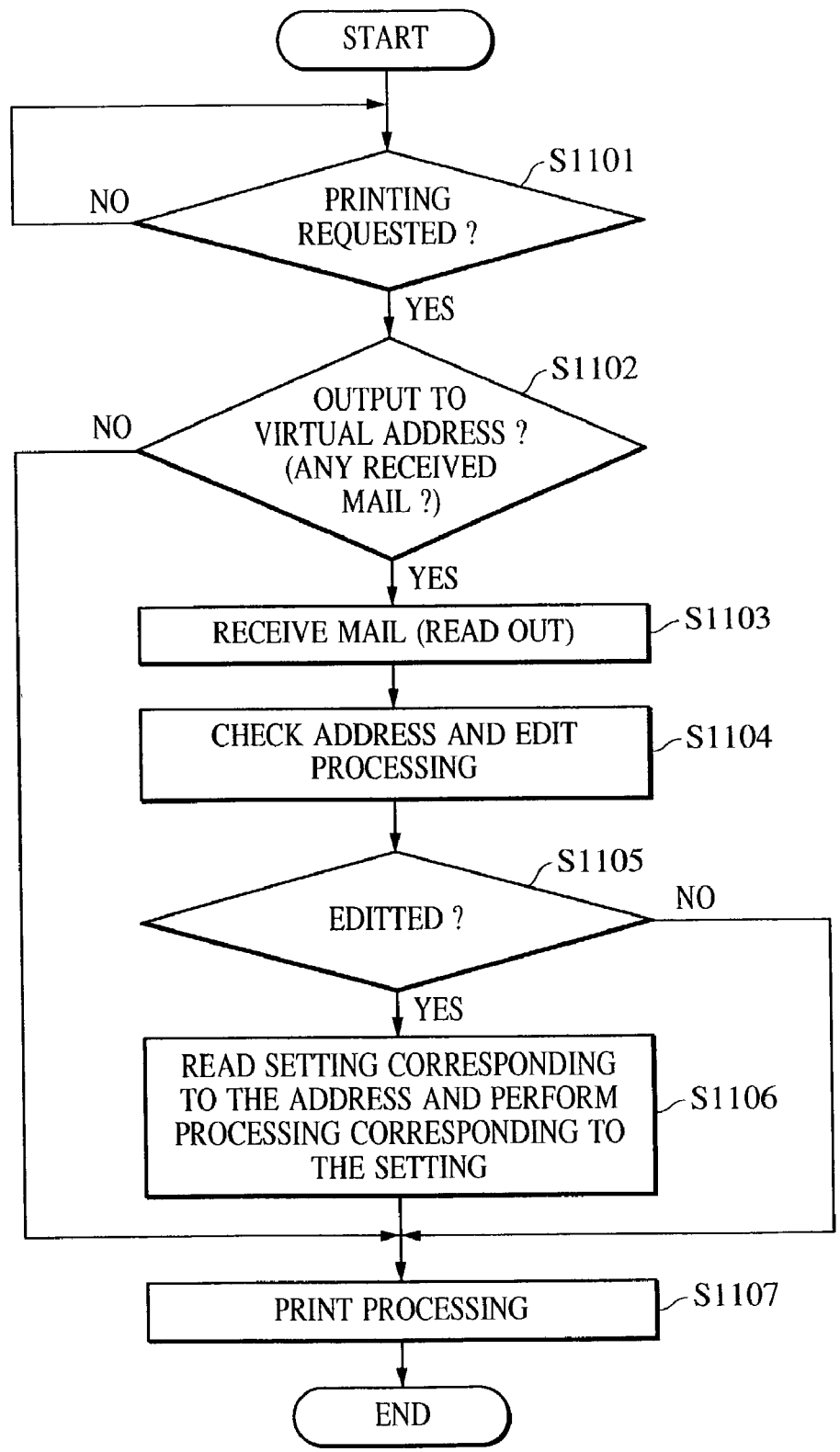
FIG. 11 is a flowchart for edit switching processing by using multiple ports.

Next, flows of edit processing and print processing will be described with reference to FIG. 11 where a print job is sent to an e-mail address held by the digital copier. In FIG. 11, a step S1101 waits a data input to the digital copier. Here, the presence of a print request is determined when a print job is input from another terminal not through an e-mail, when message receiving is notified by a mail server for the e-mail, or when the message receiving is notified by polling the mail server.

In a step S1102, it is determined whether or not the received data is an e-mail addressed to an address registered in the address setting value correspondence table 1401, that is, an e-mail addressed to one of virtual input ports.

If the received data is not the e-mail to the virtual input port, the edit processing is not performed and the method goes to a step S1107. If the received data is a general job, the job is analyzed in print processing. Then, the edit processing such as finishing processing is performed.

In the step S1102, if the e-mail is input data to the virtual input port, a received mail is read out from the mail server in a step S1103. In a step S1104, edit processing set in accordance with the address of the receiver's address of the received e-mail is checked with reference to the address setting value correspondence table 1401. In a step S1105, it is determined whether or not a special edit processing is defined for the address. If not, the edit processing is not performed and the method goes to the step S1107. In the step S1105, if it is determined that the special edit process is defined for the receiver's address of the e-mail, the corresponding edit process is performed in a step S1106, and then the processing ends.

Here, the edit function, which can be performed in the step S1106 is one of edit functions, which can be performed before image forming, such as layout for the 4-in-1 specification or for the 2-in-1 specification or page layout when booklet printing is specified. A function involving printing and controls over components of the image forming portion, such as a function involving sorting and/or stapling processing, is performed in accordance with the setting along with the print processing in the step S1107. If an e-mail having an attached file is printed, the user may set in advance that the specified edit process is performed on either (a) an e-mail message and the attached file or (b) only the attached file. Then, print processing in accordance with the specification may be performed.

As described above, the digital copier according to this embodiment holds e-mail addresses, each of which functions as a virtual input port, that is, a setting, and a function to be performed may be set for each virtual input port, that is, for each e-mail address holding an account. In accordance with a virtual input port to which a print job is input, the corresponding set function is performed. Thus, even from a network terminal, which may not be set for the use of edit functions of the digital copier in the print job, the edit functions can be used by using virtual input ports.

Even if terminals in a network do not have a driver program corresponding to functions of the output devices such as a printer and a digital copier, virtual input ports corresponding to functions unique to each kind of output device may be assigned so as to use output devices from each of terminals. As a result, a driver program does not have to be developed or prepared for every type of output devices.

The virtual input ports may be used by various kinds of devices because the virtual input port may be supplied as an e-mail address.

The virtual input port may be used in exactly the same way from terminals in a wide area network through a common carrier and from terminals in a local area network.

Second Embodiment

According to the first embodiment, a desired output result can be obtained by giving multiple e-mail addresses to a digital copier as virtual input ports and by sending a job to one of the virtual input ports, that is, e-mail addresses, corresponding to edit functions required by the host computer. In this example, URLs are given as the virtual input ports instead of the e-mail addresses. Only differences from the first embodiment will be described herein.

Figure 15:
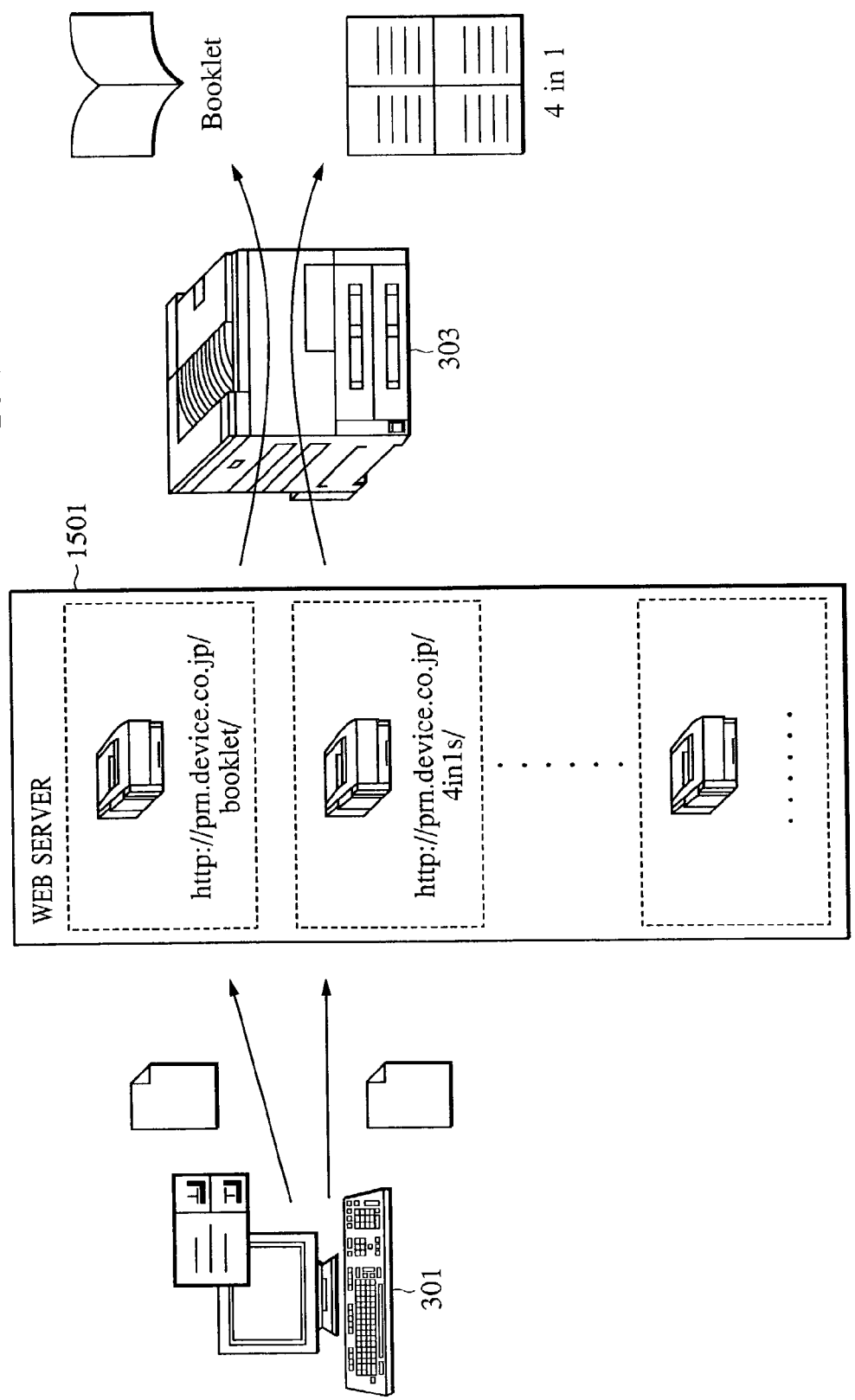
FIG. 15 is a schematic diagram of edit switching processing by using multiple URLs.

FIG. 15 schematically shows processing for performing output corresponding to edit functions with URLs set as multiple virtual input ports. In FIG. 15, a case will be illustrated where the "booklet processing" and "4-in-1 processing" are performed as edit processing. Here, the "booklet processing" and the "4-in-1 processing" are other names of one digital copier, respectively. In FIG. 15, when a job needs to be sent from the host computer to the digital copier to perform booklet processing for output, the job may be sent to "http://prn.device.co.jp/booklet/", which is a URL assigned to the "booklet processing" in the print system. Thus, the digital copier performs booklet processing on the job for output. In the same manner, when 4-in-1 processing is needed for output, the job may be sent to "http://prn.device.co.jp/4in1s/", which is a URL assigned to the "4-in-1 processing" in the print system. Thus, the digital copier performs the 4-in-1 processing on the job for output.

In this embodiment, a web server 1501 for providing URLs, which are input ports, does not have to be an independent server but may be implemented by the digital copier 303. In this case, the print job is stored in an area (folder) corresponding to the specified URL. Therefore, instead of the e-mail address in the steps in FIG. 11, a specified function is determined based on the job stored place corresponding to the URL. In FIG. 13, the address list lists e-mail addresses. Here, sub-addresses of the URLs may be used instead.

The same effects as those of the first embodiment may also be achieved according to this embodiment. In addition, by using an http protocol, a content of a folder specified by a given URL may be referred from a host computer sending a print job. Thus, a list of print jobs for each function may be monitored from a source terminal.

The present invention may be applied to a system including multiple devices (such as a host computer, an interface device, a reader and a printer). Alternatively, the present invention may be applied to one single apparatus including one device (such as a copier and a facsimile device).

The object of the present invention may be achieved by providing a system or an apparatus with a memory medium (or a recording medium) in which software program code for implementing functions according to the embodiments are stored. Then, a computer (or CPU or MPU) of the system or the apparatus reads and executes the program code stored in the memory medium.

In this case, the program code itself read from the memory medium implements the functions according to the embodiments. Accordingly, the memory medium storing the program code is one aspect of the present invention.

The functions according to the embodiments can be implemented by executing the read program code by means of the computer. Also, the functions according to the embodiments may be implemented by performing a part or all of the processing itself by means of an operating system (OS) running on the computer in accordance with an instruction of the program code.

The functions according to the embodiments may be implemented as follows: The program code is read from the memory medium and is written in a memory provided in a functional extension card inserted to the computer or in a memory provided in a functional extension unit connected to the computer. Then, a part or all of the processing itself is performed by a CPU provided in the functional extension card or the functional extension unit in accordance with an instruction of the program code.

As described above, according to the present invention, multiple virtual input ports corresponding to edit functions are provided in order to obtain an output by performing an edit function thereon corresponding to one of the virtual input ports to which a print job is input. Thus, functions may be used, which cannot be set in the print job.

Therefore, a terminal, which cannot have setting for using the functions in the print job, can use the edit functions by using the virtual input ports.

Driver programs corresponding to unique functions are not necessary.

The functions through virtual input ports may be used in exactly the same manner from terminals in a wide area network and/or terminals in a local area network.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing device comprising:
   a storage unit for storing an address setting correspondence table including e-mail addresses and printing setting values set in accordance with the e-mail addresses;
   a determination unit for determining whether a received e-mail address is an address registered in the address setting value correspondence table or not based on said address setting correspondence table; and
   a processing unit for reading out a printing setting value corresponding to the e-mail address from said address setting correspondence table when said determination unit determines that the e-mail address is an address registered in the address setting value correspondence table,
   wherein said processing unit does not perform editing processing when said determination unit determines that an address is not the address registered in the address setting value correspondence table, and said processing unit reads out a printing setting value corresponding to an e-mail address from said address setting correspondence table and performs editing processing in accordance with the read printing setting value when said determination unit determines that the address is an address registered in the address setting value correspondence table.

2. A printing device according to claim 1, wherein said processing unit performs editing processing including layout processing.

3. A printing device according to claim 1, wherein said processing unit performs printing processing including finishing processing.

4. A printing device according to claim 1, further comprising an editing unit for editing said address setting correspondence table.

5. A printing device according to claim 4, wherein said editing unit notifies that a mail address cannot be registered if the identical mail address is already present when registering the mail address.

6. A printing method in a printing device comprising a storage unit for storing an address setting correspondence table including e-mail addresses and printing setting values set in accordance with the e-mail addresses, comprising:
   a determination step of determining whether a received e-mail address is an address registered in the address setting value correspondence table or not based on said address setting correspondence table; and
   a processing step of reading out a printing setting value corresponding to an e-mail address from said address setting correspondence table and performing processing in accordance with the read printing setting value when it is determined in said determination step that the e-mail address is an address registered in the address setting value correspondence table,
   wherein processing is not performed in said processing step when it is determined in said determination step that the mail address is not an address registered in the address setting value correspondence table, and a printing setting value corresponding to the e-mail address is read out from said address setting table and editing processing is performed in accordance with the read printing setting value in said processing step when it is determined in said determination step that the mail address is an address registered in the address setting value correspondence table.

7. A printing method according to claim 6, wherein editing processing including layout processing is performed in said processing step.

8. A printing method according to claim 6, wherein printing processing including finishing processing is performed in said processing step.

9. A printing method according to claim 6, further comprising an editing step in which said address setting correspondence table is edited.

10. A printing method according to claim 9, wherein it is notified that a mail address cannot be registered if the identical mail address is already present when the mail address is registered in said editing step.

* * * * *

UNITED STATES PATENT AND TRADEMARK OFFICE
CERTIFICATE OF CORRECTION

PATENT NO. : 7,167,264 B2
APPLICATION NO. : 10/202912
DATED : January 23, 2007
INVENTOR(S) : Takamiya It is certified that error appears in the above-identified patent and that said Letters Patent is hereby corrected as shown below:

TITLE PAGE, ITEM [56]:
References Cited, "2002/0191210 A1*12/2002 Staas et al" should read
-- 2002/0191210 A1*12/2002 Staas et al. --.

COLUMN 1:
Line 48, "diver-less" should read -- driver-less --.

COLUMN 2:
Line 15, Delete "a" second occurrence.

COLUMN 3:
Line 57, "setting." should read -- settings. --.

COLUMN 5:
Line 14, "poling" should read -- polling --.

COLUMN 6:
Line 60, "[YES]" should read -- [NO] --.

COLUMN 7:
Line 25, "[Back  ]0" should read -- [BACK] --;
Line 44, "degree." should read -- degrees. --;
Line 50, "Button" should read -- button --;
Line 62, "[2in 1]" should read -- [2 in 1] --; and
Line 65, "[4in 1]" should read -- [4 in 1] --.

COLUMN 8:
Line 17, "[2 in 1]"should read-- [2 in 1]--; and
Line 28, "form," should read -- form --.

COLUMN 9:
Line 47, "devices." should read -- device. --.

UNITED STATES PATENT AND TRADEMARK OFFICE
CERTIFICATE OF CORRECTION

PATENT NO. : 7,167,264 B2
APPLICATION NO. : 10/202912
DATED : January 23, 2007
INVENTOR(S) : Takamiya It is certified that error appears in the above-identified patent and that said Letters Patent is hereby corrected as shown below:

COLUMN 10:
Line 27, "referred" should read -- referred to --; and
Line 66, "port" should read -- ports --.

Signed and Sealed this

Thirteenth Day of November, 2007

JON W. DUDAS
*Director of the United States Patent and Trademark Office*